United States Patent
McConnell

(10) Patent No.: US 9,008,617 B2
(45) Date of Patent: *Apr. 14, 2015

(54) LAYERED GRAPHICAL EVENT MAPPING

(75) Inventor: James T. McConnell, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1468 days.

This patent is subject to a terminal disclaimer.

(21) Appl. No.: 11/617,140

(22) Filed: Dec. 28, 2006

(65) Prior Publication Data

US 2008/0162556 A1    Jul. 3, 2008

(51) Int. Cl.
*H04M 1/66* (2006.01)
*G06F 21/55* (2013.01)

(52) U.S. Cl.
CPC ...... *G06F 21/552* (2013.01); *G06F 2221/2111* (2013.01)

(58) Field of Classification Search
USPC ............ 455/404.1, 404.2, 406, 410, 456.1–3; 707/104.1; 726/22, 26
See application file for complete search history.

(56) References Cited

U.S. PATENT DOCUMENTS

| | | | |
|---|---|---|---|
| 4,729,737 A | | 3/1988 | Reagan et al. |
| 5,515,285 A | | 5/1996 | Garrett et al. |
| 5,781,704 A | * | 7/1998 | Rossmo .......................... 706/45 |
| 5,848,373 A | | 12/1998 | DeLorme et al. |
| 5,940,598 A | * | 8/1999 | Strauss et al. .................. 709/249 |
| 6,088,804 A | | 7/2000 | Hill et al. |
| 6,163,604 A | * | 12/2000 | Baulier et al. ................. 379/189 |
| 6,240,360 B1 | | 5/2001 | Phelan |
| 6,377,987 B1 | | 4/2002 | Kracht |
| 6,430,274 B1 | | 8/2002 | Winstead et al. |
| 6,456,306 B1 | | 9/2002 | Chin et al. |
| 6,456,852 B2 | | 9/2002 | Bar et al. |
| 6,633,230 B2 | | 10/2003 | Grandin et al. |
| 6,691,161 B1 | | 2/2004 | Cook et al. |
| 6,691,256 B1 | | 2/2004 | Cook et al. |
| 6,813,777 B1 | | 11/2004 | Weinberger et al. |
| 6,816,090 B2 | * | 11/2004 | Teckchandani et al. ...... 340/989 |
| 6,832,247 B1 | | 12/2004 | Cochran et al. |
| 6,839,852 B1 | | 1/2005 | Pantuso et al. |
| 6,900,822 B2 | | 5/2005 | Germain et al. |
| 6,917,288 B2 | | 7/2005 | Kimmel et al. |

(Continued)

FOREIGN PATENT DOCUMENTS

WO     2005/076135     8/2005

OTHER PUBLICATIONS

Brown et al., "Crime Mapping for Computer Crimes", Charlottesville, VA, Jun. 9, 2000.

(Continued)

*Primary Examiner* — Christopher M Brandt
*Assistant Examiner* — Joseph Dean, Jr.

(57) ABSTRACT

A system, method and computer program product for graphically overlaying multiple types of events in order to facilitate determining one or more courses of action are each disclosed. Events are received from an event detection system or from another source, correlated with an address or location, and representatively mapped on an electronic map configured to be displayed on a display device. Mapped events may include cyber attacks or intrusions, credit card fraud based on the location of use of the credit card, check (and check-card) fraud based on usage location, 911 calls, law enforcement demographic data, and telecommunications based fraud.

28 Claims, 11 Drawing Sheets

(56) References Cited

U.S. PATENT DOCUMENTS

| | | | |
|---|---|---|---|
| 6,941,359 | B1 | 9/2005 | Beaudoin et al. |
| 7,031,728 | B2 | 4/2006 | Beyer |
| 7,082,535 | B1 | 7/2006 | Norman et al. |
| 7,096,498 | B2 | 8/2006 | Judge |
| 7,146,568 | B2 | 12/2006 | Richardson |
| 7,227,950 | B2 * | 6/2007 | Faith et al. ............... 380/44 |
| 7,243,008 | B2 | 7/2007 | Stockdale et al. |
| 7,260,844 | B1 | 8/2007 | Tidwell et al. |
| 7,269,796 | B1 | 9/2007 | Bayes et al. |
| 7,272,648 | B2 | 9/2007 | Kawasaki et al. |
| 7,272,795 | B2 | 9/2007 | Garding et al. |
| 7,337,222 | B1 | 2/2008 | Du et al. |
| 7,337,408 | B2 | 2/2008 | DeLuca et al. |
| 7,342,581 | B2 | 3/2008 | Vinberg |
| 7,349,982 | B2 | 3/2008 | Hannum et al. |
| 7,418,733 | B2 | 8/2008 | Connary et al. |
| 7,609,156 | B2 | 10/2009 | Mullen |
| 8,015,604 | B1 | 9/2011 | Tidwell et al. |
| 8,082,506 | B1 | 12/2011 | McConnell |
| 8,091,130 | B1 | 1/2012 | McConnell |
| 8,171,555 | B2 | 5/2012 | D'Mello et al. |
| 8,201,257 | B1 | 6/2012 | Andres et al. |
| 8,352,739 | B2 | 1/2013 | Park et al. |
| 8,359,343 | B2 | 1/2013 | McConnell |
| 8,538,676 | B2 | 9/2013 | Wuersch et al. |
| 8,561,175 | B2 | 10/2013 | Williams et al. |
| 8,571,580 | B2 | 10/2013 | Altman et al. |
| 8,590,047 | B2 | 11/2013 | Hoyt et al. |
| 8,615,582 | B2 | 12/2013 | Mcclure et al. |
| 8,620,344 | B2 | 12/2013 | Huang et al. |
| 8,634,860 | B2 | 1/2014 | Huang et al. |
| 8,655,371 | B2 | 2/2014 | Huang |
| 8,711,698 | B2 | 4/2014 | Cohen et al. |
| 8,719,198 | B2 | 5/2014 | Zheng et al. |
| 8,745,090 | B2 | 6/2014 | Caduff |
| 2003/0018769 | A1 | 1/2003 | Foulger et al. |
| 2003/0115211 | A1 * | 6/2003 | Chen et al. ............... 707/102 |
| 2003/0200347 | A1 | 10/2003 | Weitzman |
| 2003/0232598 | A1 | 12/2003 | Aljadeff et al. |
| 2004/0003285 | A1 | 1/2004 | Whelan et al. |
| 2004/0044912 | A1 | 3/2004 | Connary et al. |
| 2004/0117624 | A1 | 6/2004 | Brandt et al. |
| 2004/0121787 | A1 | 6/2004 | Day et al. |
| 2004/0172466 | A1 | 9/2004 | Douglas et al. |
| 2004/0233234 | A1 | 11/2004 | Chaudhry et al. |
| 2004/0240297 | A1 * | 12/2004 | Shimooka et al. ........... 365/222 |
| 2004/0260945 | A1 | 12/2004 | Raikar et al. |
| 2005/0075116 | A1 * | 4/2005 | Laird et al. ............... 455/456.3 |
| 2005/0075119 | A1 | 4/2005 | Sheha et al. |
| 2005/0206513 | A1 | 9/2005 | Fallon |
| 2006/0004497 | A1 | 1/2006 | Bull |
| 2006/0041345 | A1 | 2/2006 | Metcalf |
| 2006/0200490 | A1 | 9/2006 | Abbiss |
| 2007/0008885 | A1 * | 1/2007 | Bonner ............... 370/230 |
| 2007/0038568 | A1 * | 2/2007 | Greene et al. ............... 705/50 |
| 2007/0079243 | A1 | 4/2007 | Leigh et al. |
| 2007/0204033 | A1 * | 8/2007 | Bookbinder et al. ......... 709/224 |
| 2009/0138353 | A1 | 5/2009 | Mendelson |
| 2009/0157744 | A1 | 6/2009 | McConnell |
| 2009/0172773 | A1 | 7/2009 | Moore |
| 2009/0249460 | A1 | 10/2009 | Fitzgerald et al. |
| 2010/0311386 | A1 | 12/2010 | Edge et al. |
| 2011/0016536 | A1 | 1/2011 | O'Brien et al. |
| 2011/0099281 | A1 | 4/2011 | Bakker et al. |
| 2011/0183644 | A1 | 7/2011 | Gupta |
| 2011/0189971 | A1 | 8/2011 | Faccin et al. |
| 2011/0195687 | A1 | 8/2011 | Das et al. |
| 2012/0252493 | A1 | 10/2012 | Siddeley et al. |

OTHER PUBLICATIONS

Clancy, et al, "Security threats to signal classifiers using self-organizing maps," Department of Electrical and Computer Engineering University of Maryland, College Park, Proceedings of the 4th International Conference on Crown.com 2009, 6 pages.

Fu, et al, "The Digital Marauder's Map: A New Threat to Location Privacy," IEEE 29th IEEE International Conference on Distributed Computing Systems, 2009 p. 589-596.

* cited by examiner

| Attack Name | Attacker / Victim |
|---|---|
| Telnet Attack | 10.1.1.1 |
| Witty Worm | 10.1.1.2 |
| Telnet Attack | 10.1.2.1 |

FIG. 3B

| PHYSICAL CRIME DATABASE ||
|---|---|
| CRIME INFORMATION | LOCATION OF CRIME |
| Auto theft. | 1717 Astoria Way, Redmond, Washington |
| Armed robbery of a business. | 1405 Dixie Hwy., Atlanta, Georgia |
| Presenting a forged instrument. | 705 Autumn Pike, Abilene, Texas |

FIG. 3C

| IP Address | Router Address |
|---|---|
| 10.1.1.1 | 02-69-8C-01-02-03 |
| 10.1.1.2 | 02-69-8C-01-02-03 |
| 10.1.2.1 | 02-69-8C-01-02-04 |

| Router Logical Address | Router Physical Address | City | State | Zip Code |
|---|---|---|---|---|
| 02-69-8C-01-02-03 | 7979 Beltline Road | Irving | TX | 75039 |
| 02-69-8C-01-02-04 | 2319 E. Fowler Avenue | Tampa | FL | 33612 |

FIG. 3F

| Attack Name | Attacker / Vicitm | Address | City | State | ZIP | Status | Assigned to |
|---|---|---|---|---|---|---|---|
| RPC Bo | 10.1.1.1 | 7979 Beltline Road | Irving | TX | 75039 | Fixed | Tom |
| RPC Bo | 10.1.2.1 | 2319 E. Fowler Avenue | Tampa | FL | 33612 | Open | Fred |
| SSH Bo | 10.1.1.2 | 7979 Beltline Road | Irving | TX | 75039 | Fixed | Mary |

LAYERED GRAPHICAL EVENT MAPPING

BACKGROUND INFORMATION

Traditional crime fighting by government and private groups against so-called "physical" crimes such as robberies, thefts, burglaries, rape, murder, arson, etc. has employed the use of mapping to represent the locations of crimes that have already occurred. This is done in a detective aspect to attempt to determine patterns, motives, and potential suspects as well as in a predictive quality in an attempt to anticipate victims or at least locations having an increased likelihood of experiencing a crime. This mapping has proved to be a valuable resource for solving and mitigating crime; however, it does not offer a complete picture.

Crimes in today's more technologically advanced world are more sophisticated and subtle than muggings, robberies and car-thefts occurring on the streets and easily associated with physical locations. The hacking of networks such as those now ubiquitous in billing and financial systems, viruses launched against computer systems, intrusions onto computer hosts and networks, fraudulent activities resulting in the theft of services such as telephone service (wired or wireless), cable television, Internet access, etc. are just a few examples of more technologically-sophisticated crimes that are not easily mapped to a physical location.

Businesses and organizations have also used technology in attempts to thwart these technologically-advanced crimes. One method is through the detection of anomalies in data associated with business transactions, such as the detection of unauthorized or malicious users on computer hosts and networks, often called intrusion detection and fraud detection systems.

For example, computer applications are created having several layers with each layer including detective, preventive, and corrective controls. At the business transaction layer, the detective controls apply business rules used for supervisory type reports that may be voluminous depending upon the nature of the business and the number of transactions occurring. Though a geographical correlation may exist between physical, network and computer-related crimes, such correlation may not be apparent from review of numerous discrete reports from various sources and of varying types and formats while simultaneously trying to mitigate the crime and respond to them.

These response schemes do not allow for an organization's management to easily identify the geographical location of the problem(s) and the location(s) at which resources are most needed. Furthermore, current response schemes do not allow an organization's response or management team timely access to geographical view(s) of the location of the crimes together with information relating to the status or progress of the response to the intrusion.

BRIEF DESCRIPTION OF THE DRAWINGS

FIG. 3B is one embodiment of intrusion information within the intrusion database;

FIG. 3C is one embodiment of physical crime information within the physical crime database;

FIG. 3D is one exemplary embodiment of the ARP information within the ARP database;

FIG. 3E illustrates one exemplary embodiment of the location information within location database;

FIG. 3F illustrates exemplary map database records for intrusion events in an embodiment according to the present invention;

DETAILED DESCRIPTION OF PREFERRED EMBODIMENTS

Figure 1A:
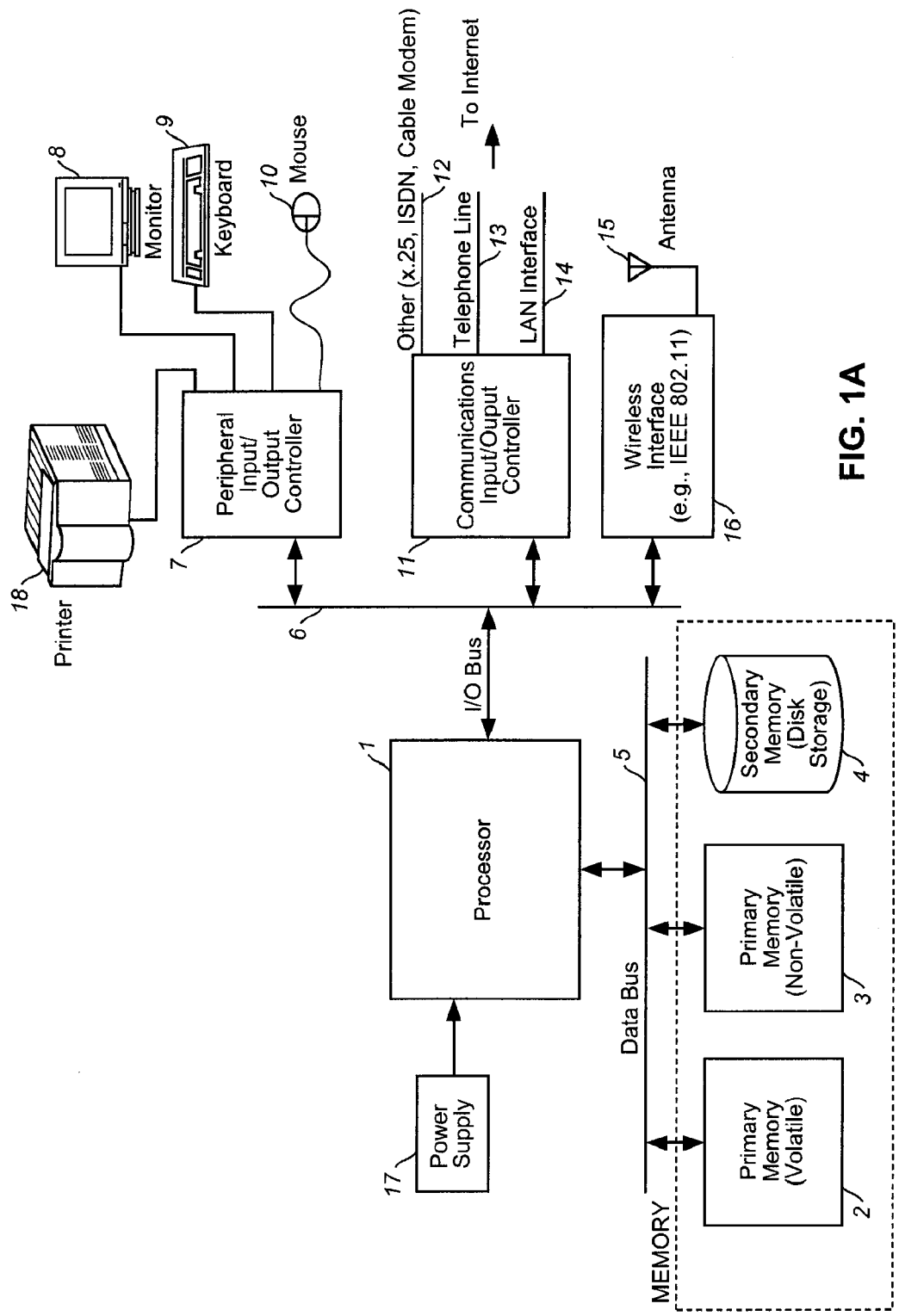
FIG. 1A is one embodiment of a computing device is illustrated that can be used to practice aspects of the preferred embodiment according to the present invention.

The preferred embodiments implemented according to the present invention now will be described more fully with reference to the accompanying drawings, in which some, but not all possible embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated, the preferred embodiments may be implemented as a method, a data processing system, or a computer program product. Accordingly, preferred embodiments of the present invention may take the form of an entirely hardware embodiment, an entirely software embodiment, or an embodiment combining software and hardware aspects. Furthermore, implementations of the preferred embodiments may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

The preferred embodiments according to the present invention provide systems, methods and procedures, and computer program products for bringing together crime mapping to graphically overlay multiple types of crimes to determine a course of action. For example, the preferred embodiments of the present invention allow the mapping of cyber attacks or intrusions, credit card fraud based on the location of use of the credit card, check (and check-card) fraud based on usage location, 911 calls, law enforcement demographic data, and telecommunications based fraud. Separate mapping of such data is helpful in crime fighting, but overlaying this data increases the quality and focus of a response. Furthermore, the graphical inclusion of non-crime data such as sales information, census figures, property value, etc. allows prioritization and focus of response resources. By providing layered graphical crime mapping, various demographic, business and security decisions can be made such as, for example, whether the risk in an area is too high to conduct business.

As used herein, a "fraud" is an unauthorized use of an electronic network to use deception to obtain a service, good or other thing of value from another in reliance upon the deception.

As used herein, an "intrusion" is an unauthorized use, attempt, or successful entry into a digital, computerized, or automated system, requiring a response from a human administrator or response team to mitigate any damage or unwanted consequences of the entry. For example, the introduction of a virus and the unauthorized entry into a system by a hacker are each "intrusions" within the spirit of the present invention. An "intrusion response" is a response by systems or human operators to limit or mitigate damage from the intrusion or prevent future intrusions. "Intrusions" of many types and natures are contemplated.

In addition, as used herein, a "vulnerability" is a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Then, all computers running the Windows operating system with less than Service Pack 6 will therefore have this vulnerability. This and other vulnerabilities may be identified by commercially available software products. While methods of locating such vulnerabilities are outside the scope of the present invention, any of the vulnerabilities identified or located by such software products, now known or later developed, are within the spirit of the present invention.

In addition, as used herein, a "mitigation response" is the effort undertaken to reduce unwanted consequences or to eliminate the intrusion. For example, such a response may entail sending a human computer administrator to the site of the location to update software, install anti-virus software, eliminate a virus, or perform other necessary tasks. In addition, a response may entail installing a patch to the vulnerable computer, such as across a network. The present invention does not contemplate any specific responses. Instead, any response to an intrusion requiring the organization of resources is within the scope and spirit of the present invention.

For the ease of discussion, the following discussion will focus on the systems and methods of the present invention in terms of mapping "threats." Reference to "threats" includes frauds, intrusions and vulnerabilities.

Computer or Computing Device

In the preferred embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a "dumb" terminal used to access data or processors over a network. Turning to FIG. 1A, one embodiment of a computing device is illustrated that can be used to practice aspects of the preferred embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
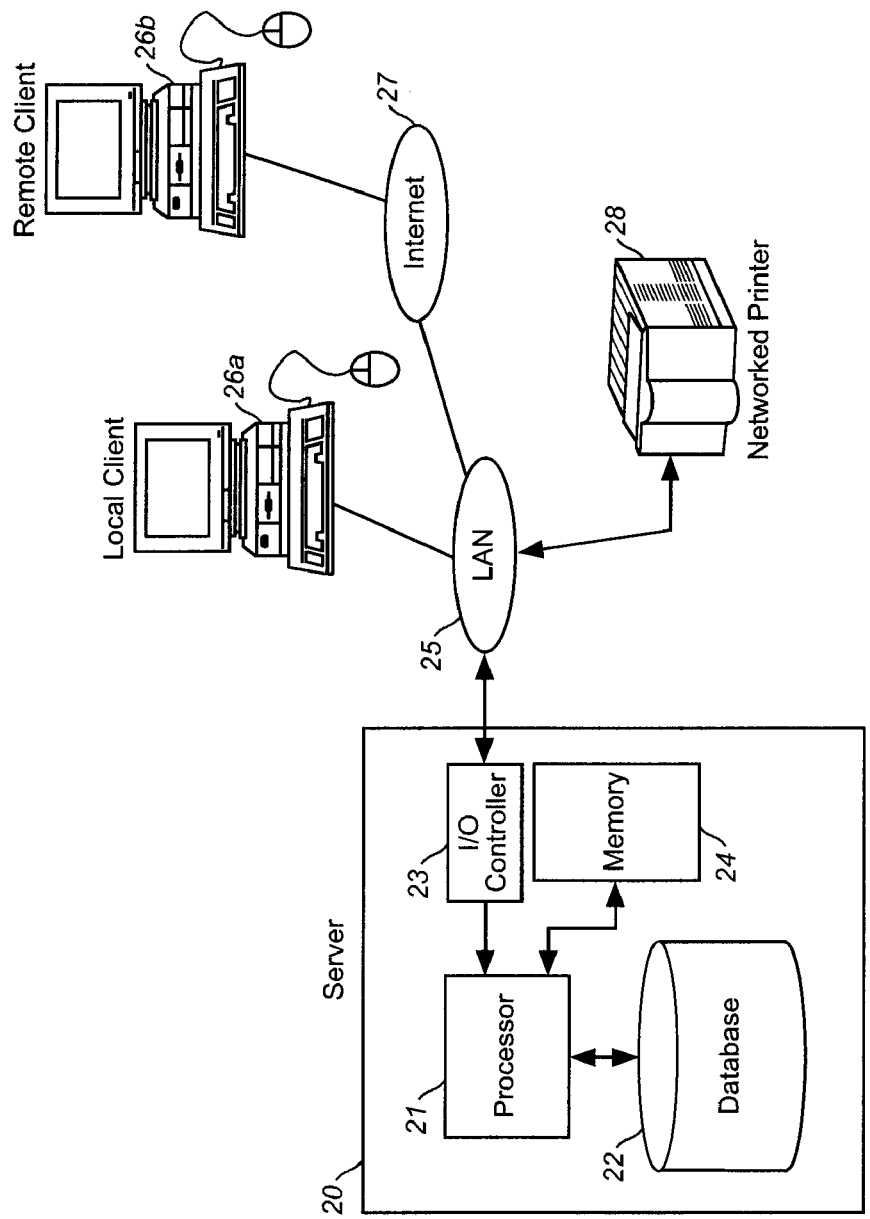
FIG. 1B is an alternative embodiment of a processing system that may be used according to the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the Internet 27, over the LAN 25, and to the server 20.

Many other alternatives and architectures are possible and can be used to practice the preferred embodiments. The embodiments illustrated in FIGS. 1A and 1B can be modified in different ways and be within the scope of the present invention as claimed.

Methods, systems and articles of manufacture consistent with features and principles of the present invention facilitate the detection of potential fraud in transactions and intrusions into networks by combining anomaly detection, rule violation and pattern matching operations. A collection of application transactions resulting from using one or more systems determines business patterns or behavior of a user. These patterns are used to detect anomalies in the user's behavior, are compared to business rules for violations, and are compared to historical transaction patterns of the user or other users. When the information derived from these detection and comparison operations indicates potential fraud or intrusion, a system monitor (for example, a person or another system) is alerted to the potential activity. For example, U.S. patent application Ser. No. 11/319,608, "Multidimensional Transaction Fraud Detection System and Method," having as an inventor James T. McConnell and filed on Dec. 29, 2005, fully incorporated herein by reference and made a part hereof, describes a system and method of detecting fraudulent activities by monitoring transactions. As another example, U.S. patent application Ser. No. 10/916,873, "Geographical Intrusion Response Prioritization Mapping System," also having as an inventor James T. McConnell, and filed on Aug. 12, 2004, fully incorporated herein by reference and made a part hereof, describes a system and method of detecting and mapping intrusions into digital, computerized or automated systems.

Figure 2A:
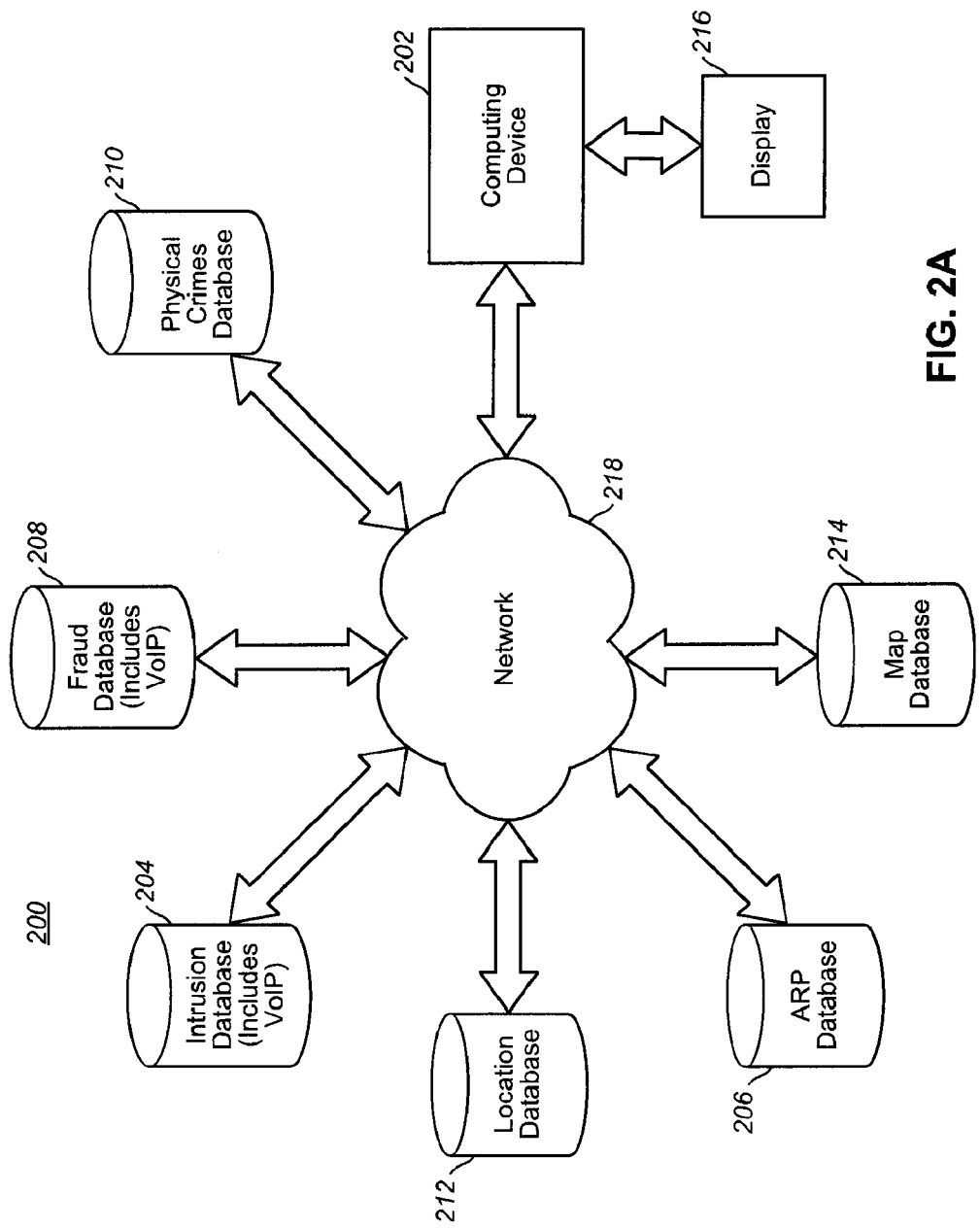
FIG. 2A is a block diagram of one exemplary environment in which the systems and methods of the present invention may be implemented.

FIG. 2A is a block diagram of one exemplary environment in which the systems and methods of the present invention may be implemented. As shown in FIG. 2A, system 200 employs a computing device 202 that may be used for mapping. Such a computing device may be one such as is shown in FIGS. 1A and 1B, above, and the corresponding description, though other computing devices capable of performing a mapping function are contemplated within the scope of this invention. In addition, the embodiment of system 200 may also employ databases such as an intrusion database 204, an address routing protocol (ARP) database 206, a fraud database 208, a physical crimes database 210, a location database 212, a mapping database 214, etc., each in electronic communication with computing device 202. System 200 also includes a display 216, such as a video display, for displaying the geographic information correlated and mapped by computing device 202 using the methods discussed herein, and a network 218, in electronic communication with the computing device 202. The components that comprise the system 200 communicate with one another through the network 218, which may be wired, wireless, optical or combinations thereof. The network 218 is comprised of physical and virtual devices and connections and may include computer software executing on the processors of one or more computing devices, memory, firmware and the network may support one or more communications protocols such as, for example, TCP/IP.

Figure 2B:
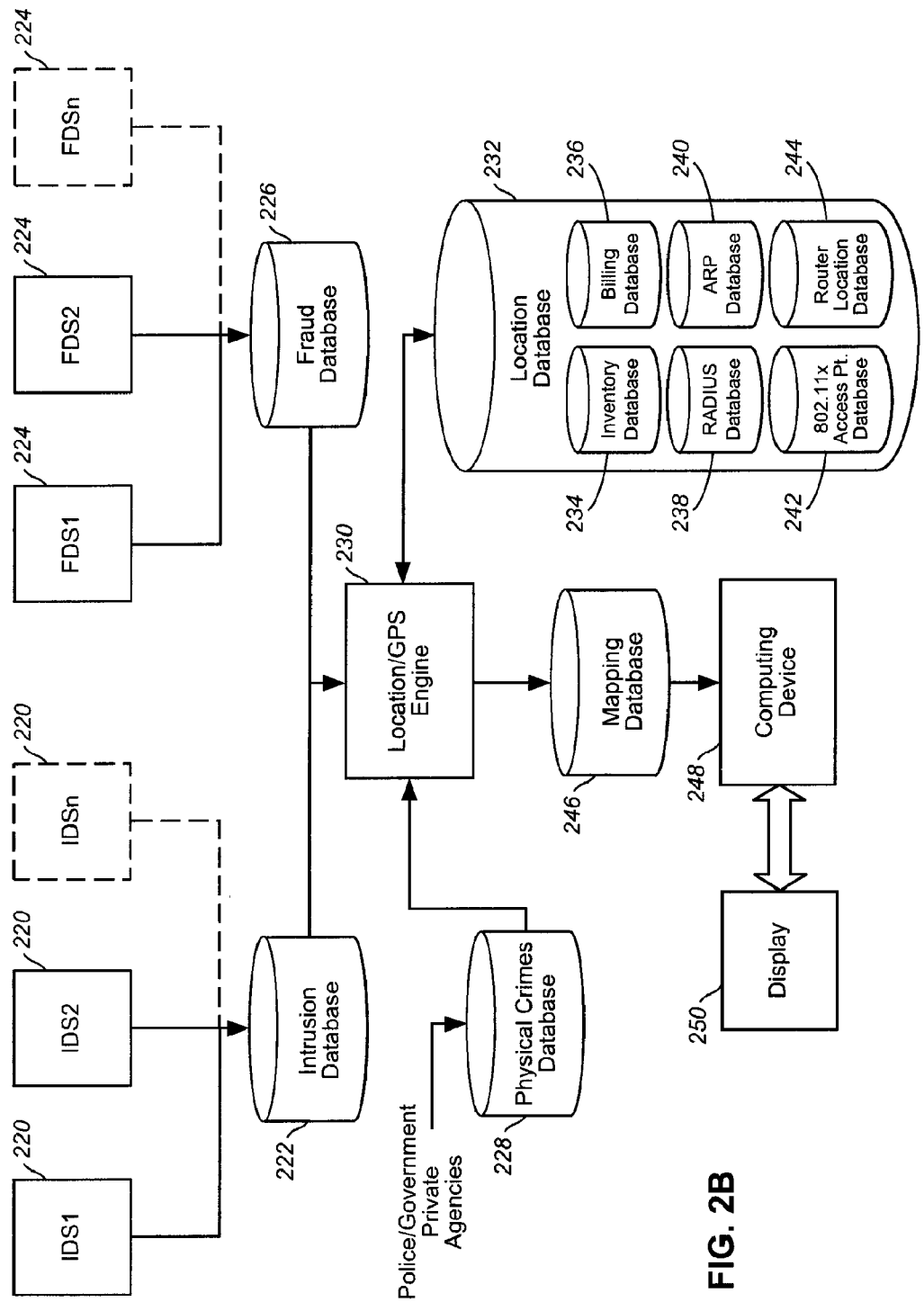
FIG. 2B is an alternative block diagram of one exemplary environment in which the systems and methods of the present invention may be implemented.

An alternative block diagram of one exemplary environment in which the systems and methods of the present invention may be implemented is shown in FIG. 2B. In FIG. 2B, one or more intrusion detection systems (IDSs) 220, such as the one described in U.S. patent application Ser. No. 10/916,873, are used to populate an intrusion database 222. Likewise, one or more fraud detection systems (FDSs) 224, such as the one described in U.S. patent application Ser. No. 11/319,608, are used to populate a fraud database 226. Similarly, information from police and other government agencies, or private crime fighting organizations, is used to populate a physical crimes database 228. Information from each of these databases 222, 226, 228 is provided to a location/GPS engine 230 operating on one or more processors on one or more computing devices. Information provided to the location/GPS engine 230 may include, for example, data related to the nature of the intrusion, fraud or physical crime, information from which a location may be determined such as, for example, an IP address, a telephone number, a street address, etc. The location/GPS engine 230 receives the provided database information and, if a more accurate location is needed or if the provided address is to be verified or correlated with other location information, the location/GPS engine 230 accesses a location database 232. The location database 232 may be comprised of a number of separate databases or it may be an amalgamation of information from various sources and databases into one database. In one exemplary embodiment, the location database 232 may be comprised of an inventory database 234 that includes information about telecommunications and network equipment and the location of such equipment; a billing database 236 that includes information about billing addresses for telecommunications, ISP, CATV or other system, network or services subscribers; a RADIUS database 238, which is further described herein; an ARP database 240, which is also further described herein; an IEEE 802.11x access point database 242, which provides physical locations of 802.11x addresses; and a router location database 244 which provides physical locations of router addresses. It is to be appreciated that this is just one embodiment of a location database and it is contemplated under the scope of this invention that location databases comprised of different, more, fewer and different combinations of databases or sources of location information are contemplated.

From the location database 232, the location/GPS engine 230 determines a physical location or coordinates (e.g., GPS-latitude and longitude, horizontal and vertical, etc.) for the intrusion information, the fraud information and the crime information received from the intrusion database 222, the fraud database 226 and the physical crime database 228, respectively. The data related to the nature of the intrusion, fraud or physical crime and its associated location or coordinate information is then provided to a mapping database 246, where it is stored and may be accessed by a mapping computer program product operating computing device 248 and graphically displayed on a display 250.

As previously described, U.S. patent application Ser. No. 11/319,608 describes one method of determining fraud in transactions. However, fraud may be determined and the fraud database 226 populated in other manners, such as in accordance with the techniques described by U.S. patent application Ser. No. 11/617,152, entitled "Geographical Threat Response Prioritization Mapping System and Methods of Use", having as an inventor James T. McConnell and filed concurrently herewith, fully incorporated herein by reference and made a part hereof, in which a method of detecting fraud in telecommunications and other transactions and activities is disclosed that relies, in one embodiment, upon the monitoring of call detail records (CDRs) or advanced intelligent network (AIN) information to identify instances of potential fraud based upon, for example, rules relating to the validity or appropriateness of user behavior. The fraud database 226 may also be populated by a multidimensional detection system as also described by U.S. patent application Ser. No. 11/617,152, entitled "Geographical Threat Response Prioritization Mapping System and Methods of Use", which facilitates the detection of potential fraud in transactions from transactional systems by combining anomaly detection, rule violation and pattern matching operations. For example, a collection of transactions resulting from using one or more transaction systems may determine business patterns or behavior of a user. These patterns may be used to detect anomalies in the user's behavior, may be compared to business rules for violations, and may be compared to historical transaction patterns of the user or other users to identify potential instances of fraud.

In regard to databases referenced herein, including the intrusion database 222, the address routing protocol (ARP) database 240, the fraud database 226, the physical crimes database 228, the location database 232 (which may be comprised of a number of separate databases including the inventory database 234, the billing database 236, the RADIUS database 238, the ARP database 240, the IEEE 802.11x access point database 242, and the router location database 244), and the mapping database 246 may reside within the computing device 248 or may reside in any other location, such as on network 218, so long as they are in communication with the computing device 248. System 200 may include any number of databases so long as the information discussed herein may be retrieved, correlated, or stored as discussed herein.

Any of the databases described herein may be implemented using any now known or later developed database schemes or database software. For example, in one embodiment, each of the databases may be implemented using a relational database scheme, and/or may be developed using, for example, Microsoft Access™ or Microsoft Excel™ software. While one or more of the databases referenced herein may be implemented to take into account other factors outside the scope of the present invention (for example, ARP database 246 may require specific format or implementation dependent on the router within which it resides), any implementation (and location) of the present databases is contemplated within the scope and spirit of the present invention.

Figure 3A:
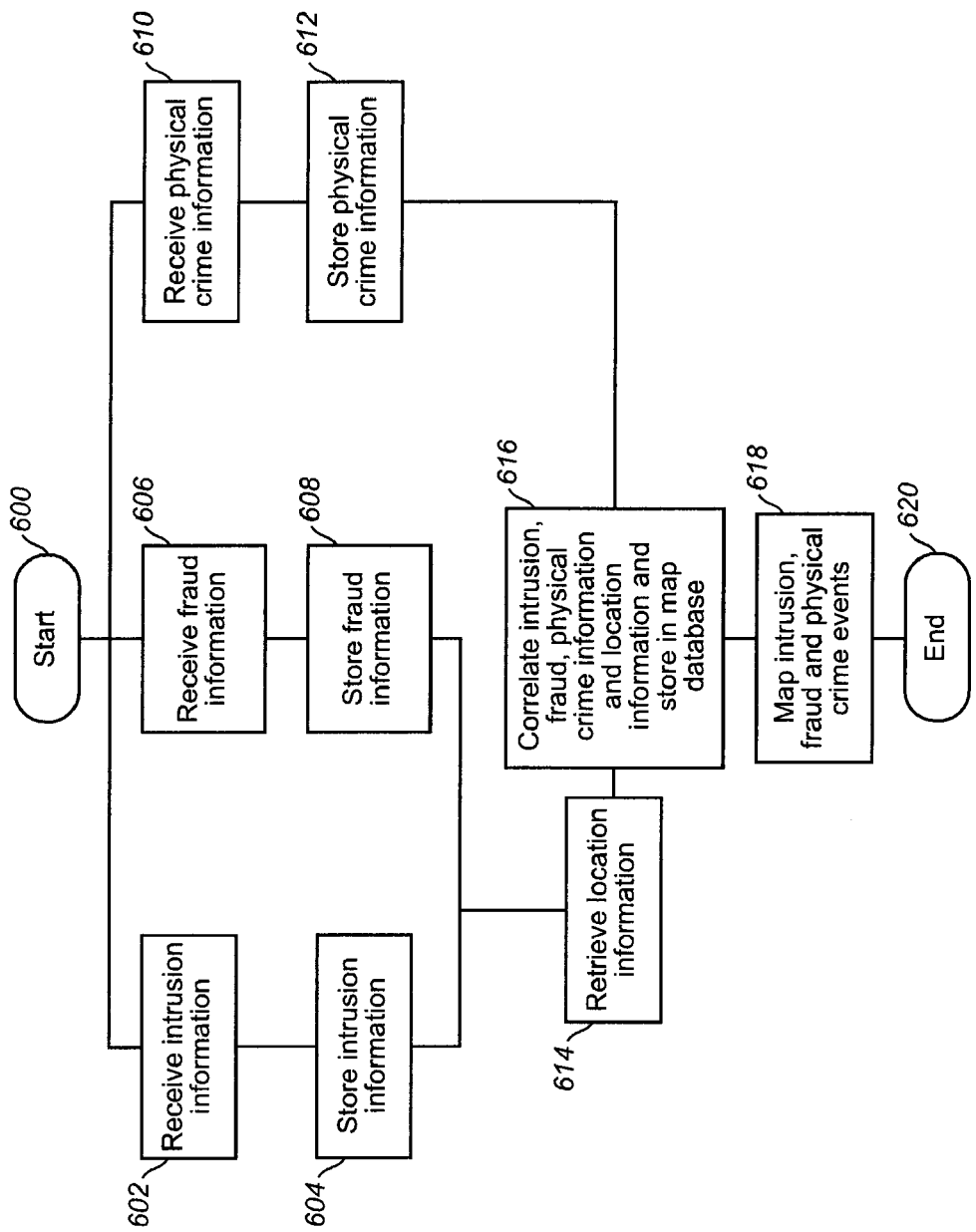
FIG. 3A is an exemplary process for layered geographic mapping of intrusion information, fraud information and physical crime information consistent with the embodiments according to the present invention.

FIG. 3A shows a process for layered geographic mapping of intrusion information, fraud information and physical crime information consistent with the embodiments according to the present invention. The process begins at step 600. At step 602, intrusion information is received such as from a computer administrator, as the output of software designed to detect intrusions, from an intrusion detection system, router, network management system, security information manager, or from any other source. In one embodiment, the intrusion information may include an identification (such as the IP address) of the computer where the intrusion started or ended, the name and description of the intrusion, and possibly other data. At step 604 and upon receipt of the intrusion information, it is stored in an intrusion database 222. FIG. 3B shows one embodiment of intrusion information within the intrusion database.

At step 606, fraud information is received such as from a network administrator, as the output of software designed to detect fraud, from a fraud detection system, switching system, network management system, security information manager, or from any other source. In one embodiment, the fraud information may include a description of the suspected fraud and one or more telephone numbers suspected of either originating the fraud or the number where the fraud terminates. At step 608 and upon receipt of the fraud information, it is stored in the fraud database 226.

At step 610, physical crime information is received such as from a police agency, a Federal investigative and executive agencies such as the FBI, DEA, BATF, etc., or from any other source. In one embodiment, the physical crime information may include a description of the crime that occurred and the description of one or more physical locations where the crime occurred. At step 612 and upon receipt of the physical crime information, it is stored in the physical crime database 228. FIG. 3C shows one embodiment of physical crime information within the physical crime database.

Returning to FIG. 3A, at step 614 location information is obtained for the information stored in the intrusion database 222 and the fraud database 226. This process has previously been described for fraud information involving PSTNs in reference to FIG. 2B. In regard to intrusion information, VoIP, and other Internet-facilitated communications, computing device 202 retrieves, for computers (or network points) at which an intrusion or telephone call started or ended, ARP information for that computer (or network point) from ARP database 240. In one embodiment, the intrusion or call information (such as the IP address) may be used as a key to retrieve the appropriate record from ARP database 240. The ARP information may include the MAC address, and router IP/MAC address or any other network address information of the network point at which the intrusion or call started or ended, as necessary. FIG. 3D shows one exemplary embodiment of the ARP information within the ARP database 240.

In addition, at step 616 computing device 202 may also retrieve geographic location information for the computing device at which the intrusion or call started or ended, from location database 232. As above, this process has already been described in relation to fraud information involving PSTNs. In one embodiment, the intrusion or call data (such as IP address) and/or the ARP data (such as the router IP/MAC address) may be used as a key to identify a record corresponding to the location database record(s), corresponding to the network point. The location information retrieved may include such information as the physical location (e.g., mailing address or GPS coordinates) for the identified network point or computer. FIG. 3E shows one exemplary embodiment of the location information within location database.

Once the location information has been retrieved from databases 222, 226, 240, 232 for the intrusion and fraud events, it along with information from the physical crimes database 228 is stored in map database 246 at step 618. Within map database 246 the retrieved information is preferably correlated such that all information for a particular intrusion, fraud or physical crime is stored in a record for that intrusion. For example, FIG. 3F shows exemplary database entries of records of map information for mapping intrusion events, such as may be stored in map database 246. As shown in FIG. 3F, map database records for intrusion events may contain the intrusion information, the network address (such as the IP or MAC address from ARP database 240), and the physical location, such as the mailing address or GPS information (from location database 232). Physical crime information stored in the map database 246 will be the same or similar to the format of information in the physical crime database 228, as is shown in FIG. 3C, though it is to be appreciated that location information for any information in the map database may be in the form or coordinates or as a described address or location. In addition, map database intrusion records may also include a status of the intrusion and an indication of the response person or team assigned to respond to the intrusion and map database fraud and physical crimes records may contain a description or code that identifies the fraud event or physical crime that occurred or is suspected to have occurred.

Upon correlating this information within map database 246, computing device 248 then maps the location of the intrusion, fraud and physical crime at step 618. In one embodiment, the location information for each record is imported into a commercially available mapping program such as, for example, MapPoint™ by Microsoft, to visually locate the intrusion, fraud and physical crime points on a map. The process ends at step 620.

Figure 4A:
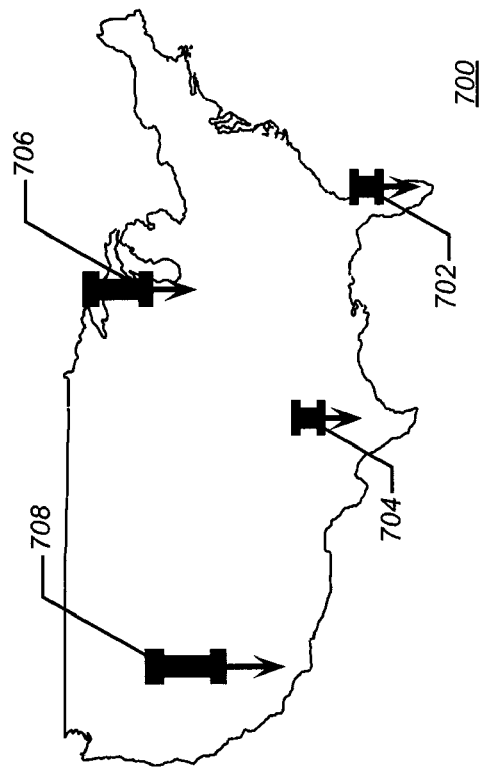
FIG. 4A is an exemplary map using push-pin icons of varying size according to the present invention.
Figure 4A:
Figure 4B:
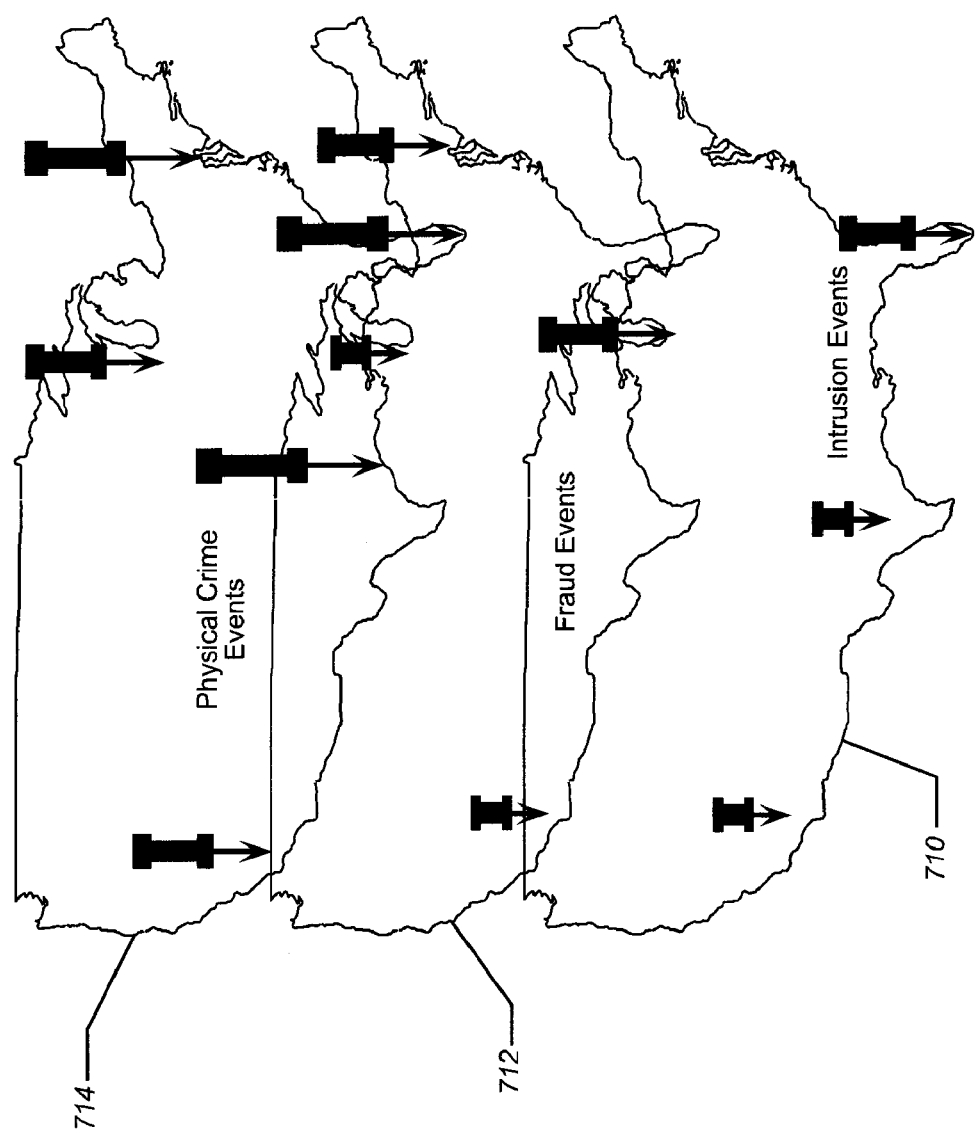
FIG. 4B is an exemplary mapping embodiment according to the present invention where push-pin icons of varying size are used in each layer to represent areas/locations of events and the size of the push-pin icon represents the magnitude of the mapped event.
Figure 4C:
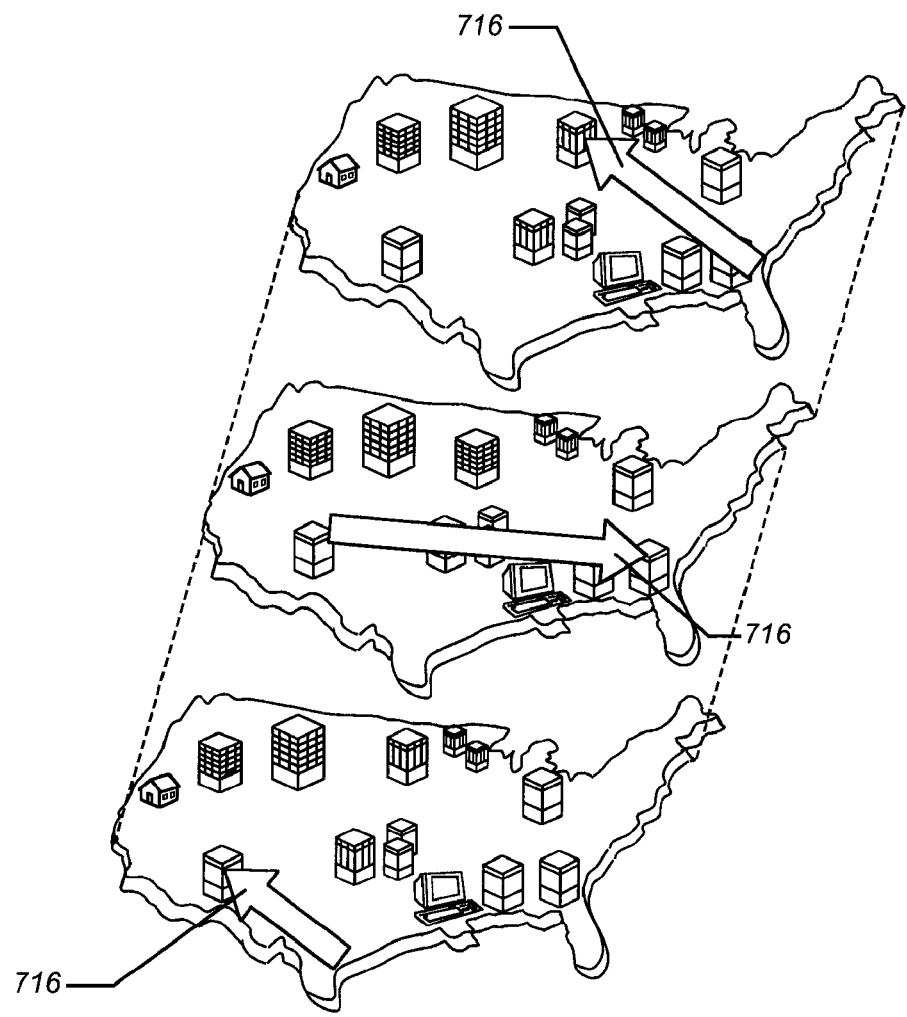
FIG. 4C is another alternate embodiment according to the present invention of mapping crime events.
Figure 4D:
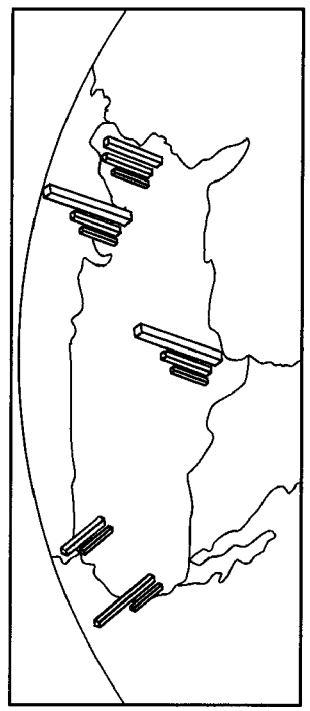
FIG. 4D is yet another embodiment according to the present invention where areas of activity related to mapped events are shown as 3-dimensional raised areas relative to the rest of the map to illustrate the magnitude of activity.

In one embodiment, the map may represent each of the events as a symbol on the map, for example, as a push pin. In one instance, different colored push-pins may be used to represent intrusions, fraud and physical crimes, respectively. It is also contemplated that different symbols may be used to represent different events (e.g. intrusions, fraud, physical crimes), and in one embodiment different colors may be used for the different symbols to represent the severity of the event or the size of the pushpin or other symbol may be used to represent the cumulative crime risk. An exemplary map 700 using this push pin of varying size approach is shown as FIG. 4A. Within map 700, each pushpin 702, 704, 706, 708 shows risks associated with intrusion, fraud and physical crime and the size of the pushpin represents the cumulative risk of those events at those locations. FIG. 4B is an alternate embodiment where the various events each have their own layer. For instance, a first layer 710 illustrates events associated with intrusions, a second layer 712 illustrates events associated with frauds, and a third layer 714 illustrates events associated with physical crimes. In the embodiment of FIG. 4B, push-pins of varying size are used in each layer to represent areas/locations of intrusion, fraud and physical crime activity while the size of the push-pin represents the magnitude of the respective activity. FIG. 4C is another alternate embodiment of mapping crime events. In FIG. 4C, layers are once again used to represent each event type (e.g., intrusion, fraud and crime), yet FIG. 4C includes the added element of arrows 716 or other means of indicating the origination and termination of the mapped activities. FIG. 4D is yet another embodiment where areas of activity related to the mapped events are shown as 3-dimensional raised areas relative to the rest of the map to illustrate the magnitude of activity.

Using one or more maps such as those shown in FIGS. 4A, 4B, 4C and 4D, response teams or system administrators will be able to identify "pockets" of fraud, intrusions and physical crime and will be able to better prioritize and more efficiently schedule response personnel to respond and mitigate or eliminate the events, based on geographic location. In addition, by continually updating the map and watching it change over time, system operators will be able to geographically view the spread, if any, of the monitored events. Furthermore, by also tracking system updates, the administrator will be able to identify new entry points, areas of likely activity, and trends for such activities, all of which may be useful for decision-making and planning purposes.

Figure 5:
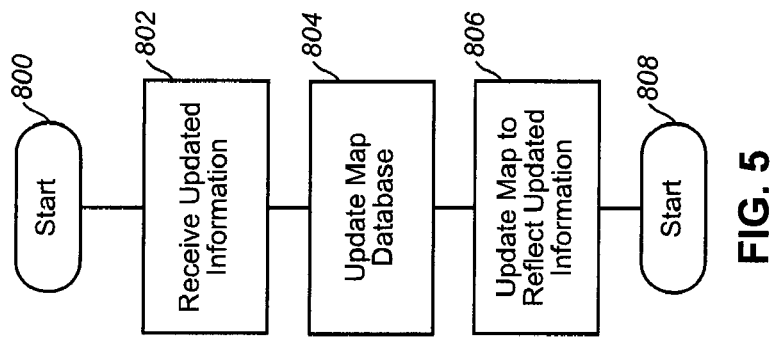
FIG. 5 is an exemplary flowchart of a process for updating a geographic map with progress information in an embodiment according to the present invention.

FIG. 5 shows a flowchart of a process for updating the geographic map with progress information. The process begins at step 800. At step 802 a response team, system administrator, etc. sends an update to the system to advise of a new status of a intrusion, fraud or physical crime. For example, the response team may advise the system that an intruded computer must be replaced, and be rendered inactive until it is replaced, (i.e., the intrusion is "open") or may advise the system that the intruded computer has been upgraded and is no longer compromised. Likewise, police and government agencies may provide updates on criminal investigations (open, suspect arrested, inactive, etc.), and the status of fraud events may also be updated to indicate whether the fraud events have ceased, whether preventative actions have been taken, etc.

Once this information is received, at step 804 the map database record for the identified intrusion is updated. For example, each record in the map database may contain a field to identify the status of the event. Possible status indicators may reflect that the intrusion is "new," "open" (i.e., not yet responded to), "assigned to a response team," "closed" (i.e., responded to and fixed), or any other status that may be of use to the organization for which the system has been implemented.

Once the map database record has been updated, at step 806 the computing device can update the map to reflect the updated status of the events. For example, one way that map can show the status information is to display color-coded push pin symbols to reflect the status. In one embodiment, a red push pin may signify an "open" or "new" intrusion, a yellow push pin may signify an event that has been assigned, but not yet fixed, and a green push pin may signify a closed event. By mapping this information together with the locations of the intrusions, administrators can better track the progress of their response teams, and more fluidly schedule responses to new events as they arise.

Any symbol or representation may be used to identify events on the map, including, but not limited to, a push-pin symbol. These symbols and representations may be used to identify the quantity of intrusions in that area of the map, such as by varying the color of the symbol to identify such quantity. In addition, the symbol or representation may be linked to the underlying data such that a user, using an input device, may select a symbol on the map causing the computing device to display the status, quantity, address, or other information corresponding to the selected symbol. The process of FIG. 5 ends at step 808.

Many modifications and other embodiments of the invention will be evident from the teachings presented in the foregoing descriptions. For instance, the method in which events are displayed on a map or the form in which data is stored in databases may differ from that described above. Accordingly, it should be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A processor-implemented method, comprising:
receiving fraud information about a plurality of fraud events that were facilitated by a network, the fraud information including, for each of the fraud events, a network address identifying a network point that facilitated the respective fraud event;
receiving network intrusion information about a plurality of intrusion events occurring in the network, where each intrusion event comprises an unauthorized attempt to enter or use a system of the network via a network point, and the network intrusion information includes, for each of the plurality of intrusion events, a network address of the network point associated with the respective intrusion event;
receiving physical crime information associated with a plurality of physical crimes, wherein the physical crime information includes geographical locations that are associated with the plurality of physical crimes, and a description of each of the plurality of physical crimes;
automatically correlating via a processor the network addresses of the network intrusion information and the network addresses of the fraud information with location information for the network points of the network to determine physical locations associated with the plurality of fraud events and physical locations associated with the plurality of intrusion events;
generating via the processor a map of subject specific overlays displaying in layers: a fraud events overlay of geographical locations of the physical locations associated with the plurality of fraud events, an intrusion events overlay of geographical locations of the physical locations associated with the plurality of intrusion events, and a physical crime events overlay of geographical locations of the physical crime locations;
identifying via the processor geographical pockets of threats derived from the fraud event locations, the intrusion events locations, and the physical crime locations, displayed on the generated multi-overlay map; and
prioritizing via the processor threat response resources according to the identified geographical pockets of threats.

2. The method of claim 1, wherein receiving fraud information about a fraud event comprises receiving a description of the fraud event and at least one telephone number.

3. The method of claim 2, wherein correlating the fraud information with location information to determine a plurality of physical locations associated with the events comprises electronically correlating the at least one phone number with at least one of an inventory database and a billing database to determine at least one physical location associated with the fraud event.

4. The method of claim 1, wherein receiving fraud information about a fraud event comprises receiving from a fraud detection system that electronically reviews call detail records a description of the fraud event and at least one telephone number.

5. The method of claim 1, further comprising electronically generating a map with a computing device and mapping software and electronically displaying on a display device computer-generated icons that show the geographical plurality of physical locations associated with the fraud event, the geographical locations of the identified network points and the geographical locations of the physical crime locations.

6. A system comprising:
a fraud detection system configured to electronically review call detail records and identify suspected fraudulent events that were facilitated by a network, thereby creating fraud information that includes, for each of the fraud events, a network address identifying a network point that facilitated the respective fraud event;
an intrusion detection system configured to electronically review network information and identify network intrusion events occurring in the network, where each intrusion event comprises an unauthorized attempt to enter or use a system of the network via a network point, thereby generating network intrusion information that includes, for each of the plurality of network intrusion events, a network address of the network point associated with the respective network intrusion event;
a physical crimes database configured to electronically store locations of occurrences of physical crimes;
a location/GPS engine configured to automatically correlate said network addresses of fraud information with one or more physical locations according to the call detail records, automatically correlate said network addresses of the network intrusion information with one or more physical locations, and obtain from said physical crimes database the locations of said occurrences of physical crimes; and
an electronic mapping system configured to receive fraud-location information indicating physical locations associated with the fraud events from said location/GPS engine, map said fraud-location information according to a fraud events overlay on an electronic multi-overlay map that is displayed on a display device, receive network-intrusion-location information indicating physical locations associated with the network intrusion events from said location/GPS engine, map said network-intrusion-location information on an intrusion events overlay of the electronic multi-overlay map that is displayed on the display device, receive physical-crime-location information indicating the locations of said occurrences of physical crimes from said location/GPS engine, map said physical-crime-location information on a physical crime events overlay of the electronic multi-overlay map that is displayed on the display device, identify geographical pockets of threats derived from the physical location information displayed on the electronic multi-overlay map, and prioritize threat response resources according to the identified geographical pockets of threats.

7. The system of claim 6, wherein said fraud information comprises at least a portion of one or more telephone numbers.

8. The system of claim 6, wherein correlating said fraud information with one or more physical locations comprises using said at least a portion of one or more telephone numbers correlated against a location database to determine said one or more physical locations.

9. The system of claim 8, wherein the location database is comprised of at least one of an inventory database and a billing database.

10. The system of claim 6, wherein said one or more physical locations are provided as one of street addresses, latitude and longitude, horizontal and vertical coordinates, or combinations thereof.

11. The method of claim 1, further comprising:
determining via the processor a cumulative risk of the identified geographic pockets of threats, wherein the cumulative risk is determined relative to a predetermined risk threshold.

12. The method of claim 5, further comprising including non-crime data along with the subject specific overlays, the non-crime data including at least one of sales information, census figures, and property values.

13. The method of claim 12, further comprising prioritizing the threat response resources further accounting for the non-crime data.

14. The method of claim 5, further comprising sizing the computer-generated icons on the display device according to a magnitude of a respective activity represented by the respective computer-generated icons.

15. The method of claim 14, wherein the magnitude of the respective activity represents a cumulative crime risk associated with the location of the respective computer-generated icons.

16. The method of claim 15, wherein the cumulative crime risk represents cumulative risk of intrusion, fraud and physical crime associated with the location.

17. A system comprising:
a fraud database comprised of fraud information associated with a plurality of fraud events that were facilitated by a network, the fraud information including, for each of the fraud events, a network address identifying a network point that facilitated the respective fraud event;
an intrusion database comprised of intrusion information about a plurality of intrusion events occurring in the network, where each intrusion event comprises an unauthorized attempt to enter or use a system of the network via a network point, and the network intrusion information includes, for each of the plurality of intrusion events, a network address of the network point associated with the respective intrusion event;
a physical crimes database comprised of physical crime information that is associated with at least the locations of the occurrences of a plurality of physical crimes;
a location/GPS engine configured to receive said fraud information from said fraud database and said intrusion information from said intrusion database, correlate the network addresses of said fraud information with physical locations thereby obtaining physical locations associated with the fraud events, and correlate the network addresses of said intrusion information with physical locations thereby obtaining physical locations associated with the intrusion events;
a mapping database configured to receive at least said physical locations of the fraud events and said physical locations of the intrusion events from said location/GPS engine and said locations of the occurrences of the plurality of physical crimes from the physical crimes database to form mapping information; and
an electronic mapping system map that is configured to
retrieve said mapping information from said mapping database,
display in layers said physical locations of said fraud events in a fraud events overlay, said physical locations of the intrusion events in an intrusion events overlay, and the physical locations of said physical crimes via computer-generated icons in a physical crime events overlay, on an electronic multi-overlay map that is displayed on a display device,
size the computer-generated icons on the display device according to a magnitude of a respective activity represented by the respective computer-generated icons,
identify geographical pockets of threats derived from the fraud event locations, the identified network point locations, and the physical crime locations, displayed on the multi-overlay map, and
prioritize via the processor threat response resources according to the identified geographical pockets of threats.

18. The system of claim 17, wherein said fraud information is comprised of at least a portion of one or more telephone numbers.

19. The system of claim 18, wherein correlating said fraud information with the plurality of physical locations comprises using said at least a portion of one or more telephone numbers correlated against a location database to determine said plurality of physical locations.

20. The system of claim 19, wherein the location database is comprised of at least one of an inventory database and a billing database.

21. The system of claim 17, wherein said intrusion information comprises at least a portion of one or more Internet Protocol (IP) addresses.

22. The system of claim 21, wherein correlating said intrusion information with the plurality of physical locations comprises using said at least a portion of one or more IP addresses correlated against a location database to determine the plurality of physical locations.

23. The system of claim 22, wherein the location database comprises at least an address routing protocol (ARP) database.

24. A computer program product, comprising:
a non-transitory computer readable medium having computer readable code embodied therein, the computer readable code being configured to, when executed by a processor of a computing device, cause the computing device to perform the method of claim 1.

25. The computer program product of claim 24, wherein the computer readable code is further configured to, when executed by the processor, cause the computing device to receive a description of each of the plurality of fraud events and at least one telephone number of each of the plurality of fraud events.

26. The computer program product of claim 24, wherein the computer readable code is further configured to, when executed by the processor, cause the computing device to electronically correlate each of the at least one phone numbers with at least one of an inventory database and a billing database to determine each of the plurality of physical locations associated with the fraud events.

27. The computer program product of claim 24, wherein the computer readable code is further configured to, when executed by the processor, cause the computing device to receive from a fraud detection system that electronically reviews call detail records a description of the fraud events and each of the at least one telephone numbers.

28. The computer program product of claim 24, wherein the computer readable code is further configured to, when executed by the processor, cause the computing device to electronically generate a multi-overlay map with a computing device and mapping software and electronically display on a display device computer-generated icons that show the geographical locations of the plurality of physical locations associated with the fraud events, the geographical locations of the identified network points and the geographical locations of the physical crime locations.

\* \* \* \* \*